June 6, 1950             J. KUGLER             2,510,474

HARVESTER FOR CABBAGES AND THE LIKE

Filed Oct. 16, 1947             4 Sheets—Sheet 1

INVENTOR,
Joseph Kugler
BY Walker P. Geyer
ATTORNEY

June 6, 1950 J. KUGLER 2,510,474
HARVESTER FOR CABBAGES AND THE LIKE
Filed Oct. 16, 1947 4 Sheets-Sheet 2

INVENTOR,
Joseph Kugler
BY Walker P. Guyer
ATTORNEY

June 6, 1950     J. KUGLER     2,510,474
HARVESTER FOR CABBAGES AND THE LIKE
Filed Oct. 16, 1947     4 Sheets-Sheet 3
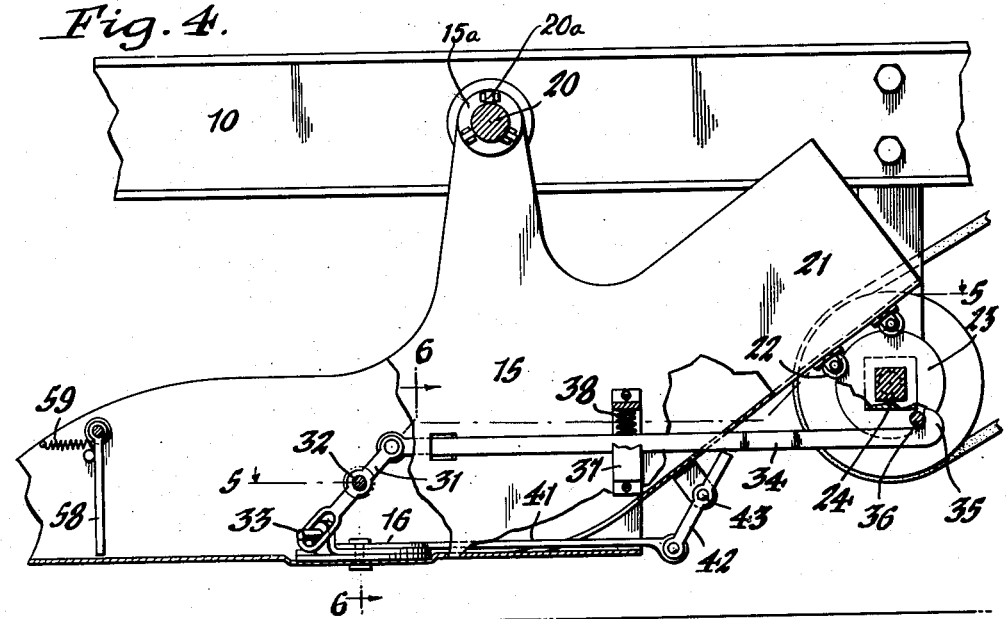
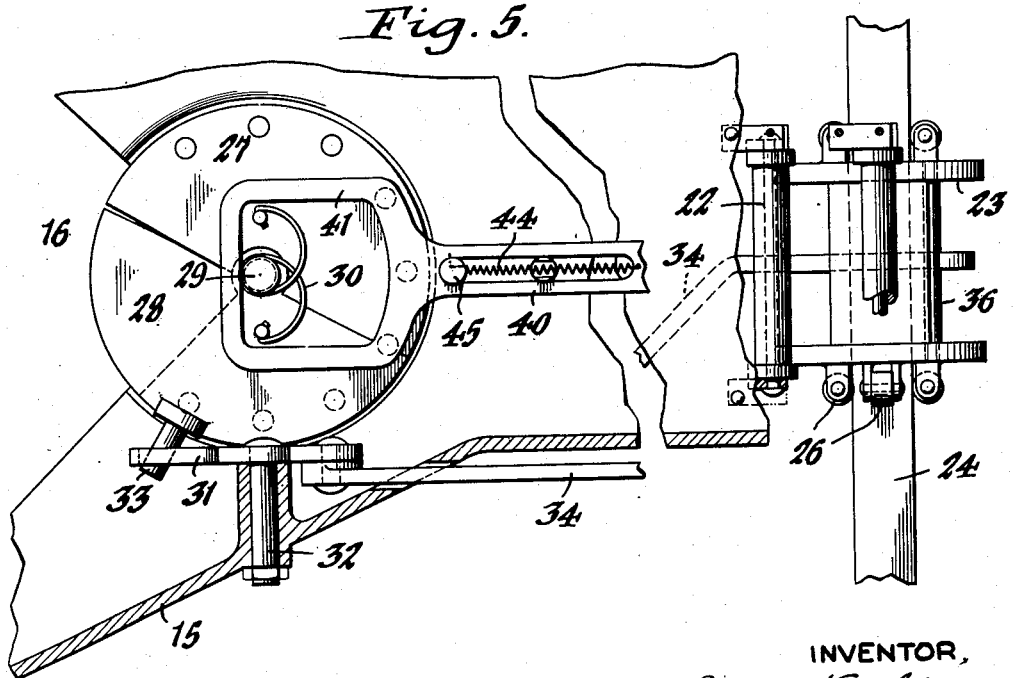
INVENTOR,
Joseph Kugler,
By Walter P. Guyer
ATTORNEY June 6, 1950 J. KUGLER 2,510,474
HARVESTER FOR CABBAGES AND THE LIKE
Filed Oct. 16, 1947 4 Sheets-Sheet 4

INVENTOR,
Joseph Kugler
BY Walker P. Guyer
ATTORNEY

Patented June 6, 1950

2,510,474

UNITED STATES PATENT OFFICE 2,510,474

HARVESTER FOR CABBAGES AND THE LIKE

Joseph Kugler, Buffalo, N. Y.

Application October 16, 1947, Serial No. 780,153

3 Claims. (Cl. 56—153)

This invention relates to certain new and useful improvements in a machine for harvesting cabbage, cauliflower and other vegetables.

It has for one of its objects to provide a machine of this character which is so designed and constructed for operative connection to a tractor or like vehicle as to effectually and efficiently cut the vegetables row by row and automatically convey and deliver them to a suitable receptacle applied to such vehicle for that purpose.

Another object of the invention is to provide a vegetable harvester having simple and novel means for severing the vegetables from the ground roots and for effecting the initiation of such severing means at a predetermined time, say upon the harvester encountering or making contact with a vegetable in its path.

Other features of the invention reside in the construction and arrangement of parts hereinafter described and particularly pointed out in the appended claims.

Figure 1:
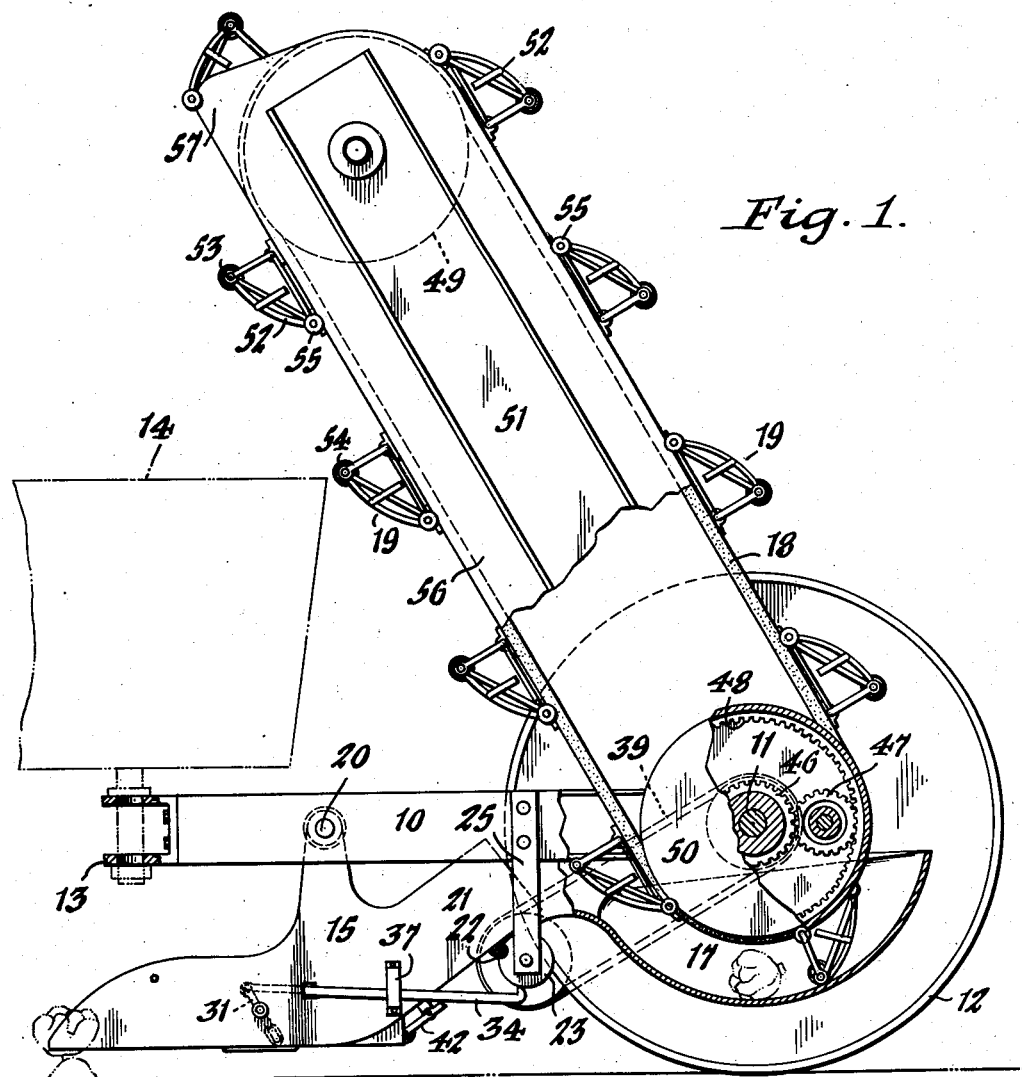
Figure 2:
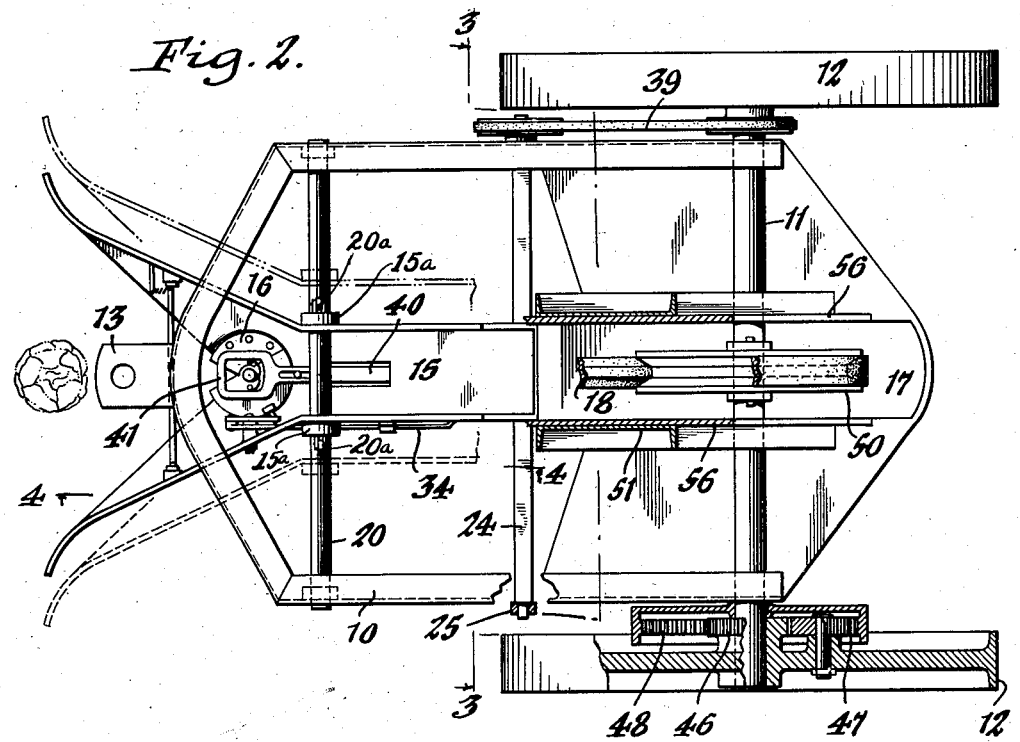
Figure 3:
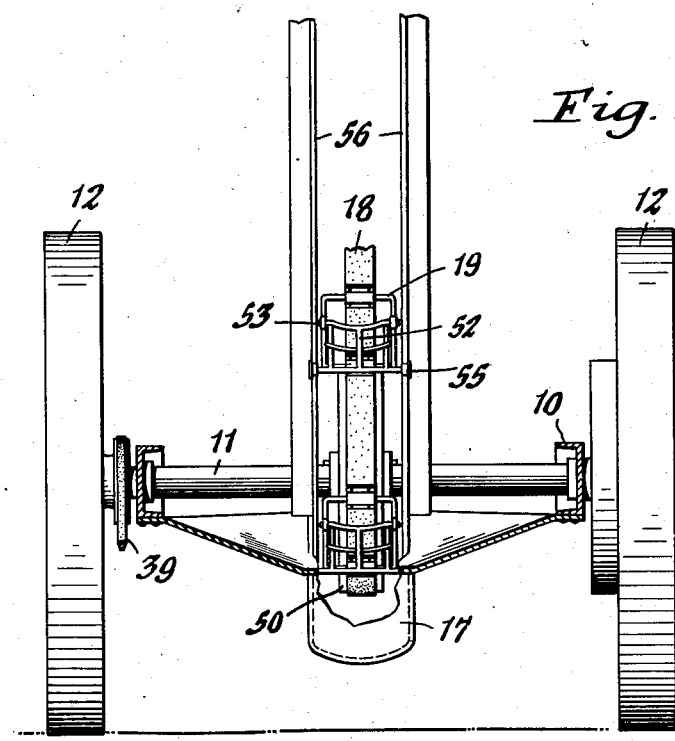
Figure 6:
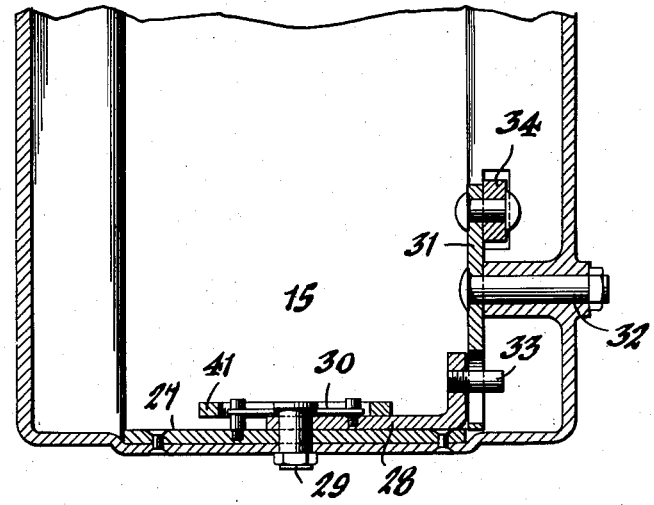
Figure 7:
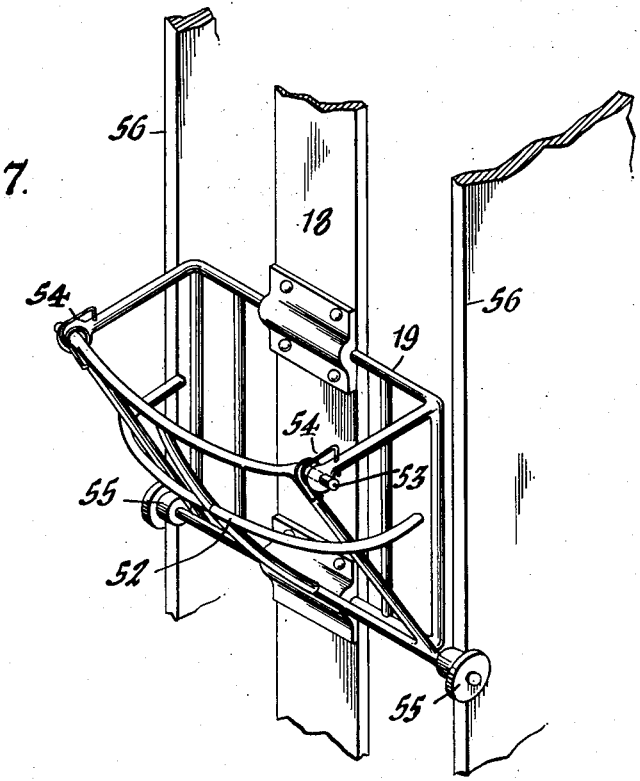

In the accompanying drawings:

Figure 1 is a side elevation, partly in section, showing my harvester in operative coupled relation to a vehicle. Figure 2 is a top plan view thereof, partly in section. Figure 3 is fragmentary transverse section taken substantially in the plane of line 3—3, Figure 2. Figure 4 is an enlarged fragmentary longitudinal section taken on line 4—4, Figure 2. Figure 5 is an enlarged fragmentary horizontal section taken substantially on line 5—5, Figure 4. Figure 6 is an enlarged fragmentary vertical section taken in the plane of line 6—6, Figure 4. Figure 7 is a fragmentary perspective view of a portion of the conveyor.

Similar characters of reference indicate corresponding parts throughout the several views.

In the preferred embodiment of my invention shown in the drawings, it consists of a suitable frame or chassis 10 having an axle 11 at its rear end on which ground-engaging wheels 12 are supported and having a draw tongue or fitting 13 at its front end for detachably coupling the harvester to a power driven vehicle having a body or receptacle 14 into which the harvested crops are delivered as the machine travels along a row of vegetables. Depending from the front end of the frame is a laterally displaceable receiver or trough-like member 15 into which the cabbages or like vegetables are directed, as the machine travels lengthwise of the row, for presentation to a cutter mechanism 16 for severing the cabbage head from its root. After being so severed, the cabbages are fed by contact with one another rearwardly along this trough and discharged one at a time into a second receiving trough or pan 17 disposed at the rear end of the frame below the axle 11. From this trough the vegetables are picked up one at a time by a conveyor 18 driven by the axle 11 and having suitable spaced buckets or receivers 19 thereon and at a predetermined time these buckets discharge their contents and empty them by gravity into the receptacle 14.

The trough-like member 15 is pendantly supported for lateral displacement from a transverse shaft 20 fixed at its ends in the frame 10 and at its front portion is bifurcated or V-shaped to properly guide the vegetables to the cutter mechanism. This trough member has collars 15$^a$ thereon provided with rollers 20$^a$ which contact the faces of the shaft 20 and permit a free sliding action of the trough member on the latter. The rear or discharge portion 21 of this trough-like member is inclined upwardly and rearwardly, as shown in Figures 1 and 4, and has grooved rollers 22 thereon which engage the peripheries of a flanged collar 23 slidingly guided for lateral movement on a rotatable square shaft 24 parallel to the shaft 20 and supported at its ends in brackets 25 pending from the frame. This collar has rollers 26 thereon which contact the faces of the shaft 24 and permit a free sliding action of such collar thereon.

The cutter mechanism is located substantially at the vertex or throat of the trough member 15 and preferably consists of relatively movable, horizontally-disposed cutter disks 27, 28, the cutter disk 27 being fixed and the companion cutter disk 28 being oscillatable about a vertical pivot 29 to and from a cutting position. A spring 30 connected to the movable disk normally urges it to the open position shown in Figure 2, while a motion-transmitting means is provided for effecting its cutting stroke. This motion-transmitting means consists of a rock lever 31 pivoted at 32 to the trough member 15 and having one arm thereof connected to a coupling pin 33 applied to the cutter disk 28 while its other arm is connected by a vertically and longitudinally displaceable actuating link 34 having a hooked end 35 adapted for releasable engagement with a drive or clutching pin 36 projecting from the collar 23. This link is guided intermediate its ends in a strap 37 and a spring 38 housed therein and bearing against such link normally urges the latter to a lowered or released position shown in Figure 1. During the harvesting operation of the machine, the shaft 24 and its collar 23 are driven from the axle 11 by a belt drive 39 so as to automatically effect the intermittent actuation of the cutter mechanism during such time as the link 34 is in the operative path of the clutching pin 36.

In the harvesting of cabbages and like vegetables, the cutter mechanism is only rendered operative at such time as a cabbage is encountered by the machine, and to this end means are provided for causing the displacement of the actuating link 34 to its operative position, shown in Figure 4, whenever a cabbage is located in the throat of the trough member 15. This means preferably consists of a contact bar 40 guided for longitudinally-reciprocating movement on the bottom wall of the trough member and terminating at its front end in an enlargement 41 constituting a vegetable abutting portion normally projecting well into the trough-throat in advance of the cutter disks 27, 28, as shown in Figure 2, while its opposite or rear end is pivotally connected to the lower arm of a rock lever 42 fulcrumed at 43 to the lower rear portion of such trough member and having its upper arm disposed for releasable supporting engagement with the adjoining rear end of the link 34. A spring 44 connected at one end to this contact bar and at its other end to a guide pin 45 normally urges the former to its forwardly projected position wherein the rock lever 42 is in a position to cause the link to be spring-urged to its released position shown in Figure 1. However, when the machine encounters a cabbage, the contact of the latter with the bar 40 causes it to be displaced rearwardly and accordingly rock the lever 42 to a position to present the actuating link 34 in the path of the clutching pin 36 and thereupon cause the movement of the cutter 28 to sever the cabbage from its root.

The drive to the axle 11 to operate the conveyor 18 and the shaft 24 to operate the cutter mechanism is derived from one of the ground wheels 12 through the medium of a gear 46 applied axially of such wheel to turn free of the axle and meshing with a pinion 47 which in turn meshes with an internal ring gear 48 keyed to the axle. This transmission assembly causes the axle 11 to be driven in a direction opposite to that of the ground wheels to operate the conveyor and cutter mechanism in the proper corresponding direction.

The conveyor 18 consists of a belt passing at its upper and lower ends around pulleys 49 and 50, the lower pulley being fixed centrally of the axle 11 and the upper pulley being supported in laterally-spaced frame members 51. The buckets or receivers 19 are preferably of open or skeleton form and of a size to receive a cabbage or the like. Each one has a movable outer wall 52 which slopes generally downwardly and inwardly from the open top of the bucket, being pivoted at its upper end at 53 to swing to an open position, as shown at the upper left hand corner of Figure 1, to discharge the cabbage into the receptacle 14. A spring 54 is provided for normally urging the movable bucket-wall to its closed position and at its opposite free ends this wall has flanged rollers 55 which travel on the outer edges of companion cam plates 56 secured to the frame members 51. When these rollers contact the corner portions 57 of cam plates, the bucket wall 52 is displaced outwardly to permit the cabbage to drop by gravity into the receptacle 17, and thereafter this wall is urged by its spring to its closed position in readiness to pick up another cabbage in the trough 17.

A vertically-swinging door 58 is disposed in the entry portion of the trough member 15 which swings upwardly to receive a cabbage in the severing station and which closes thereafter by a spring 59.

If desired, the mechanism for actuating the cutters may be continuous instead of intermittent by connecting the link 34 to the collar 23 and removing the contact bar 40 and its associated parts, in which condition the machine may be used for harvesting beans and like crops.

I claim as my invention:

1. A harvester for cabbages and the like, comprising a wheeled frame adapted to be propelled along a row of cabbages, a receiver pending from the front end of said frame for free lateral displacement and into which the cabbages are successively directed, a cutter mechanism mounted on said receiver for severing the cabbage-heads from their roots, a trough in communicating relation with the rear end of said receiver for receiving the severed cabbage-heads therefrom, a driven shaft journaled in said frame in motion-transmitting connection thereto, a member rotatable with but free to slide on said shaft, coupling means between said receiver and said member to compel their joint lateral displacement, and an operative driving connection between said shaft-member and said cutter mechanism.

2. A harvester for cabbages and the like, comprising a frame adapted to be propelled along a row of cabbages and including a driven member having a drive pin thereon, a receiver pending from the front end of the frame for lateral displacement relative thereto and having means thereon in rolling contact with said driven member, a cutter mechanism mounted on the bottom of said receiver for severing the cabbage-heads from their roots, and a displaceable actuating link guided on said receiver for releasable clutching engagement at one end with said drive pin and connected at its opposite end with said cutter mechanism for governing the same.

3. A harvester for cabbages and the like, comprising a wheeled frame including a driven member having a drive pin thereon, a receiver pendantly hung intermediate its ends from said frame to provide a receiving trough for the cabbages at its front end and an upwardly-inclined discharge trough at its rear end, means on said receiver and said driven member providing a supporting connection for the former, a cutter mechanism mounted on said receiving trough including a vertically-swinging rock lever for actuating the same, a displaceable actuating link guided on said receiver and connected at one end to said rock lever and adapted for releasable clutching engagement at its opposite end with said drive pin, a spring for normally urging said link to its released position, and means guided on said receiver for longitudinal displacement and including a cabbage-abutting element at one end and a vertically-displaceable element at its opposite end in operative engagement with said link for projecting it to its clutching position whenever a cabbage is presented into the receiver.

JOSEPH KUGLER.

REFERENCES CITED

The following references are of record in the file of this patent:

UNITED STATES PATENTS

| Number | Name | Date |
|---|---|---|
| 740,499 | White | Oct. 6, 1903 |
| 1,055,023 | De Leon | Mar. 4, 1913 |
| 1,134,184 | Cook | Apr. 6, 1915 |
| 1,434,601 | French | Nov. 7, 1922 |
| 1,535,640 | Wilson | Apr. 28, 1925 |
| 2,133,905 | Rund, Jr. | Oct. 18, 1938 |
| 2,243,650 | Poll | May 27, 1941 |
| 2,325,879 | Rico | Aug. 3, 1943 |

FOREIGN PATENTS

| Number | Country | Date |
|---|---|---|
| 845,236 | France | May 8, 1939 |